United States Patent
Zhang et al.

(10) Patent No.: US 12,548,585 B2
(45) Date of Patent: Feb. 10, 2026

(54) HYBRID AHS: A HYBRID OF KALMAN FILTER AND DEEP LEARNING FOR ACOUSTIC HOWLING SUPPRESSION

(71) Applicant: TENCENT AMERICA LLC, Palo Alto, CA (US)

(72) Inventors: Hao Zhang, Columbus, OH (US); Meng Yu, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 308 days.

(21) Appl. No.: 18/318,910

(22) Filed: May 17, 2023

(65) Prior Publication Data
US 2024/0386904 A1    Nov. 21, 2024

(51) Int. Cl.
*G10L 25/30* (2013.01)
*G10L 15/06* (2013.01)
*G10L 21/02* (2013.01)

(52) U.S. Cl.
CPC ............ *G10L 25/30* (2013.01); *G10L 15/063* (2013.01); *G10L 21/02* (2013.01)

(58) Field of Classification Search
CPC .................................................... G10L 15/063
USPC ................................................................ 704/202
See application file for complete search history.

(56) References Cited

U.S. PATENT DOCUMENTS

| | | | | |
|---|---|---|---|---|
| 9,689,958 B1 * | 6/2017 | Wild | ........................ | G01S 1/751 |
| 10,224,058 B2 * | 3/2019 | Variani | ................. | G10L 19/008 |
| 11,837,220 B2 * | 12/2023 | Kim | ..................... | G06N 3/0464 |
| 2004/0136447 A1 * | 7/2004 | LeBlanc | ............. | H04L 49/9023 |
| | | | | 704/E19.044 |
| 2009/0154380 A1 * | 6/2009 | LeBlanc | ................. | G10L 19/24 |
| | | | | 370/286 |
| 2018/0068675 A1 * | 3/2018 | Variani | .................... | G10L 15/20 |
| 2020/0251119 A1 * | 8/2020 | Yang | ................... | G10L 21/0272 |
| 2020/0294508 A1 | 9/2020 | Kwasiborski et al. | | |
| 2023/0130884 A1 | 4/2023 | de la Rey et al. | | |
| 2023/0178082 A1 * | 6/2023 | Wei | ......................... | G10L 17/18 |
| | | | | 704/232 |

(Continued)

OTHER PUBLICATIONS

Acoustic Howling Suppression with Neural Networks using Real-world Data 1st Liang Wan et al (Year: 2022).*

(Continued)

*Primary Examiner* — Bharatkumar S Shah
(74) *Attorney, Agent, or Firm* — Sughrue Mion, PLLC

(57) ABSTRACT

Method, apparatus, and non-transitory storage medium for hybrid acoustic howling suppression based on a frequency filter model and a deep neural network are provided. The method may include receiving a speech signal, the speech signal including target speech, feedback, and noise, and inputting the speech signal into a trained hybrid neural-network based howling suppression model, wherein the trained hybrid neural-network based howling suppression model is trained using training speech signal and pre-processed acoustic feedback from a first frequency filter model. The method may also include generating an enhanced speech signal with suppressed howling as an output of the trained hybrid neural-network based howling suppression model, wherein the enhanced speech signal is used to update parameters of the first frequency filter model.

20 Claims, 8 Drawing Sheets

(56) References Cited

U.S. PATENT DOCUMENTS

2023/0282197 A1\* 9/2023 Yu ........................ G06N 3/0442
381/71.11

OTHER PUBLICATIONS

Acoustic Howling Suppression with Neural Networks using Real-world Data 1st Liang Wan et al (Year: 2022) (Year: 2022).\*
International Search Report dated Apr. 26, 2024 in Application No. PCT/US23/86009.
Written Opinion of the International Searching Authority dated Apr. 26, 2024 in Application No. PCT/US23/86009.

\* cited by examiner

300

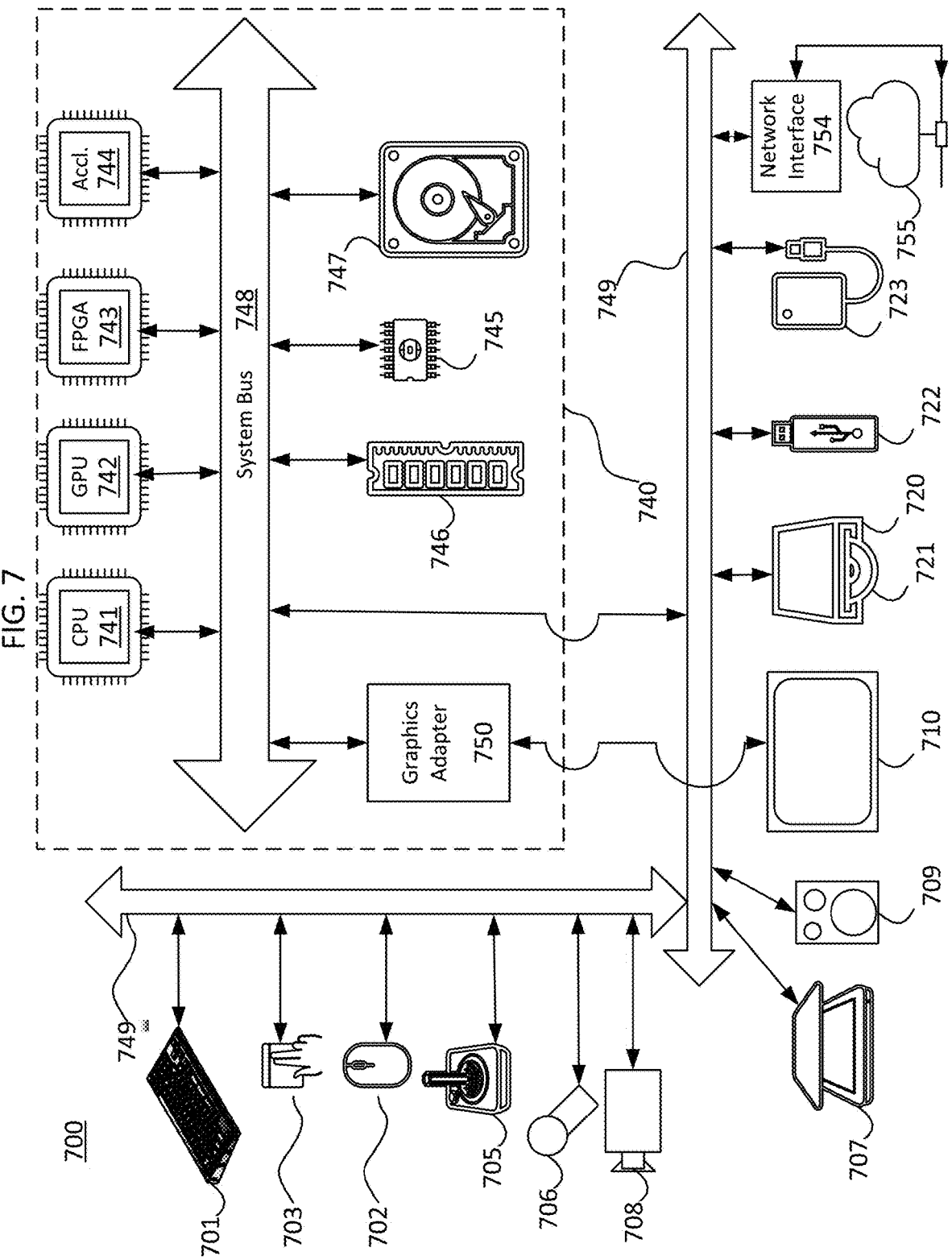

HYBRID AHS: A HYBRID OF KALMAN FILTER AND DEEP LEARNING FOR ACOUSTIC HOWLING SUPPRESSION

BACKGROUND

Acoustic howling arises when sound from the speaker's end is captured by the microphone on the same end, leading to a feedback loop that amplifies the sound until it becomes unbearable. Acoustic howling has become a crucial problem in video/audio conference and acoustic amplification systems.

Several additional methods have been proposed, including passive methods like physical isolation of microphones and speakers, and active methods such as gain reduction, notch filters, and adaptive filtering. Among these methods, adaptive filtering may dynamically adjust the signal in real-time to prevent the feedback loop and lead to relatively better speech quality. However, the adaptive filter can be sensitive to control parameters and interferences and fails to address non-linear distortions introduced by amplifiers and loudspeakers.

In related art, deep learning has been recently introduced for efficient acoustic howling suppression (AHS). However, the recurrent nature of howling creates a mismatch between offline training and streaming inference, limiting the quality of enhanced speech.

As stated above, acoustic howling is a phenomenon that arises in sound reinforcement systems where the sound emitted from speakers is picked up by a microphone and re-amplified recursively in a feedback loop, resulting in an unpleasant high-pitched sound. This can occur in different settings such as concerts, presentations, public address systems, and hearing aids. AHS refers to the process of reducing or eliminating the occurrence of acoustic howling.

Therefore, it is crucial to have robust and effective solutions that can address this discrepancy between training the deep learning model and inferring from the deep learning model for acoustic howling suppression (AHS) in a joint manner, taking into account the complex acoustics of video/audio conference and acoustic amplification systems.

SUMMARY

According to embodiments, a method for hybrid acoustic howling suppression based on a frequency filter model and a deep neural network may be provided. The method may include receiving a speech signal, the speech signal including target speech, feedback, and noise; inputting the speech signal into a trained hybrid neural-network based howling suppression model, wherein the trained hybrid neural-network based howling suppression model is trained using training speech signal and pre-processed acoustic feedback from a first frequency filter model; and generating an enhanced speech signal with suppressed howling as an output of the trained hybrid neural-network based howling suppression model, wherein the enhanced speech signal is used to update parameters of the first frequency filter model.

According to embodiments, an apparatus for hybrid acoustic howling suppression based on a frequency filter model and a deep neural network may be provided. The apparatus may include at least one memory configured to store program code; and at least one processor configured to read the program code and operate as instructed by the program code. The program may include first receiving code configured to cause the at least one processor to receive a speech signal, the speech signal comprising target speech, feedback, and noise; first inputting code configured to cause the at least one processor to input the speech signal into a trained hybrid neural-network based howling suppression model, wherein the trained hybrid neural-network based howling suppression model is trained using training speech signal and pre-processed acoustic feedback from a first frequency filter model; and first generating code configured to cause the at least one processor to generate an enhanced speech signal with suppressed howling as an output of the trained hybrid neural-network based howling suppression model, wherein the enhanced speech signal is used to update parameters of the first frequency filter model.

According to embodiments, a non-transitory computer-readable medium storing instructions may be provided. The instructions, when executed by at least one processor for hybrid acoustic howling suppression based on a frequency filter model and a deep neural network, may cause the one or more processors to receive a speech signal, the speech signal comprising target speech, feedback, and noise; input the speech signal into a trained hybrid neural-network based howling suppression model, wherein the trained hybrid neural-network based howling suppression model is trained using training speech signal and pre-processed acoustic feedback from a first frequency filter model; and generate an enhanced speech signal with suppressed howling as an output of the trained hybrid neural-network based howling suppression model, wherein the enhanced speech signal is used to update parameters of the first frequency filter model.

BRIEF DESCRIPTION OF THE DRAWINGS

FIG. 7 is a diagram of a computer system suitable for implementing embodiments.

DETAILED DESCRIPTION

Embodiments of the present disclosure relate to methods, apparatus, and systems for hybrid acoustic howling suppression based on a frequency filter model and a deep neural network are provided.

As stated above, despite significant progress in the development of AHS methods, current methods still face many challenges, especially the trade-off between suppression performance and signal distortion.

Therefore, embodiments of the present disclosure relate to a Hybrid AHS, combining two approaches to address acoustic howling: a traditional method called frequency domain filter (e.g., frequency domain Kalman filter (FDKF)) and a deep neural network (DNN) module (e.g., DNN based on self-attentive recurrent neural network (SARNN)). Specifically, the FDKF and SARNN are combined in a cascade manner with the pre-processed output from FDKF serving as an additional input for training the SARNN module. The pre-trained SARNN is then used during streaming inference, and its output is used as a reference signal for updating the FDKF parameters. During offline training, the Hybrid AHS model is trained in a teacher-forced manner that assumes only the target speech in the microphone signal is sent to the loudspeaker.

This helps convert a recursive howling suppression process to a speech separation problem and shows improved performance for howling suppression during streaming inference. The proposed embodiments leverage the advantages of both traditional adaptive filtering and deep learning based methods.

Figure 1:
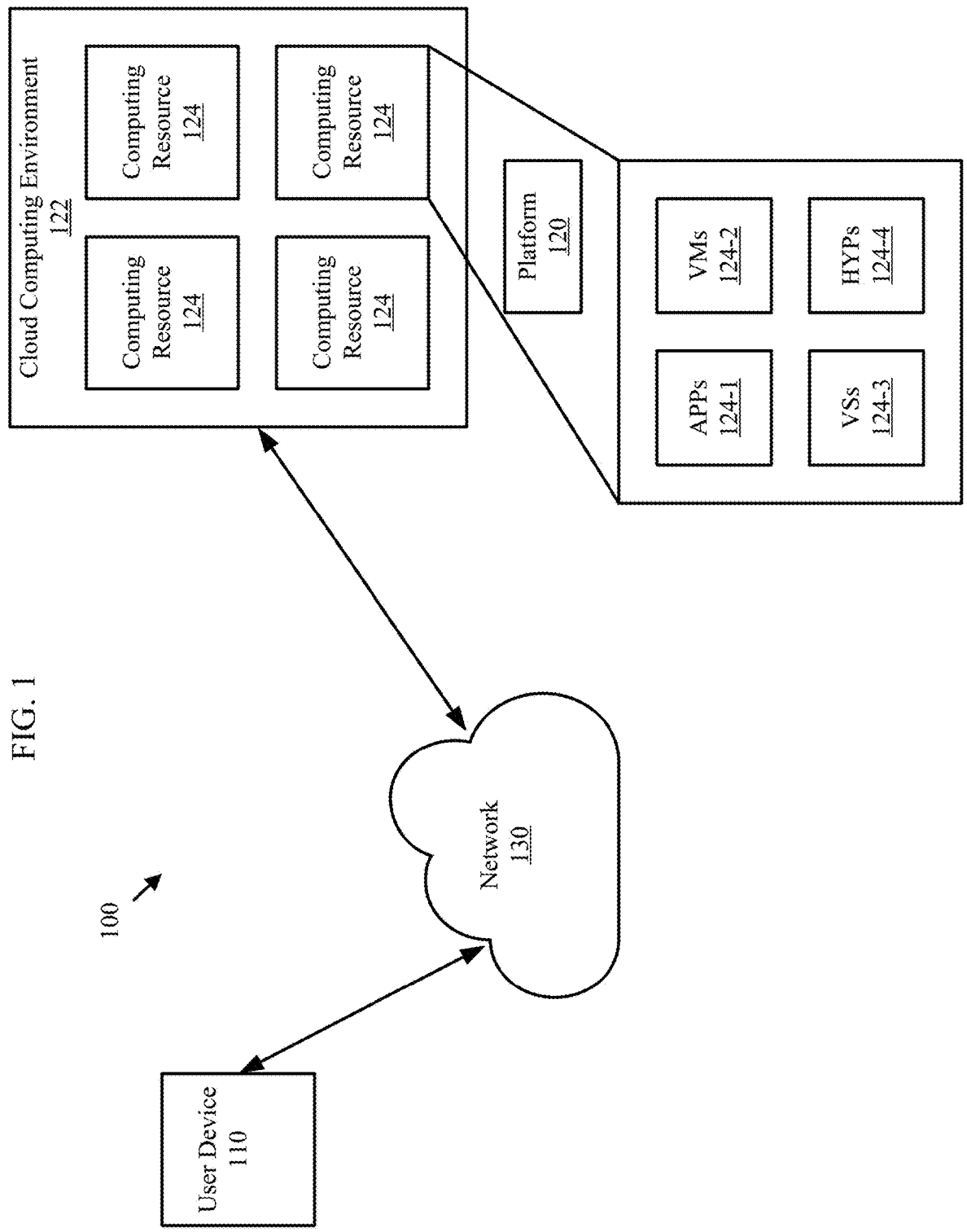
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
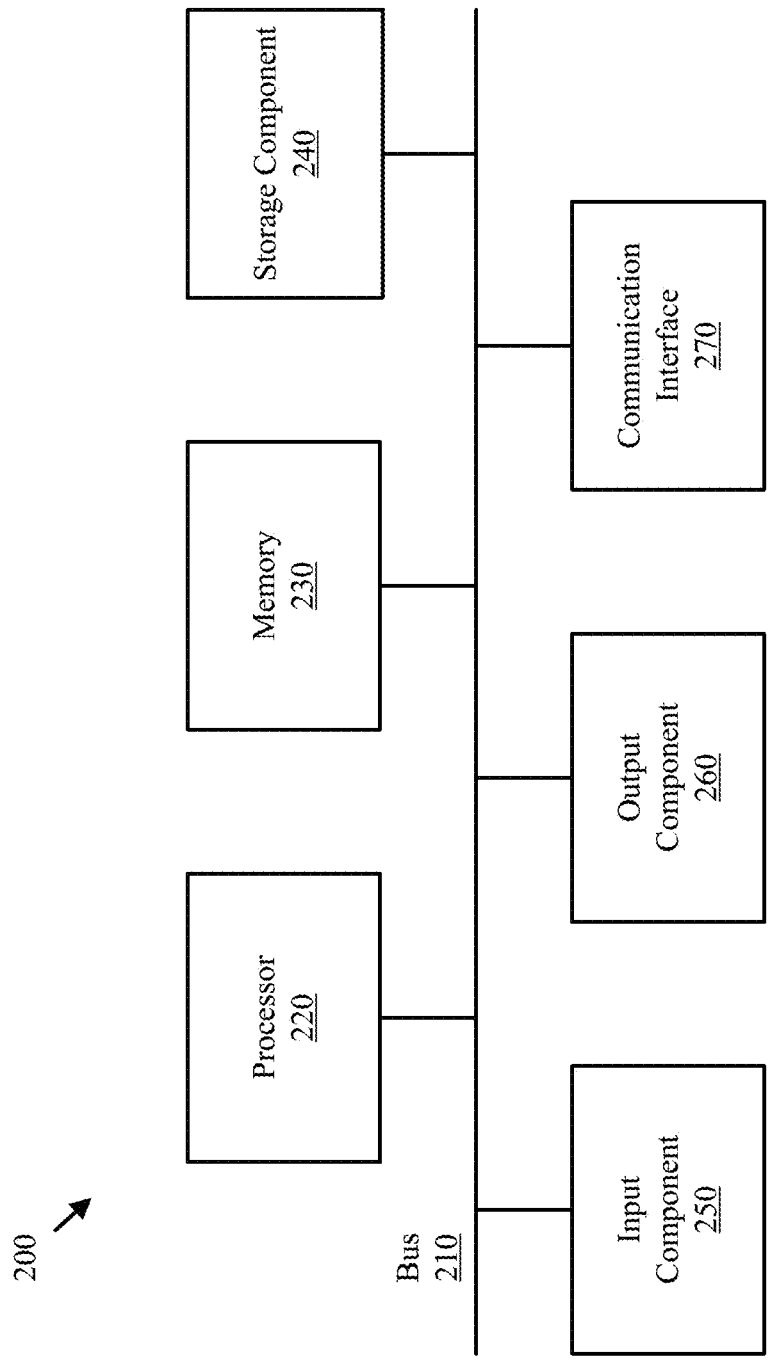
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
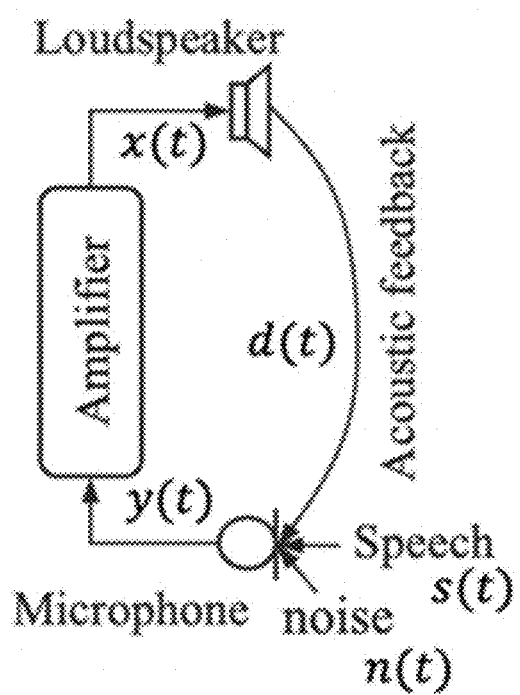
FIG. 3 is a simplified signal diagram of an exemplary acoustic amplification system, according to embodiments.

FIG. 3 is a signal diagram of an acoustic amplification system 300 according to embodiments of the present disclosure.

As shown in FIG. 3, acoustic amplification system 300 consists of a microphone and a loudspeaker where the target speech is picked up by the microphone as s(t), which is then sent to the loudspeaker for acoustic amplification. The loudspeaker signal x(t) is played out and arrives at the microphone as an acoustic feedback denoted as d(t):

$$d(t) = NL(x(t)) * h(t) \qquad \text{Eqn (1)}$$

where NL(.) denotes the nonlinear distortion introduced by the loudspeaker, h(t) represents the acoustic path from loudspeaker to microphone, and * denotes linear convolution.

When the signal is not processed, the playback signal d(t) will re-enter the pickup repeatedly, the corresponding microphone signal can then be represented as:

$$y(t) = s(t) + n(t) + NL[y(t - \Delta t) \cdot G] * h(t) \quad \text{Eqn (2)}$$

where n(t) represents the background noise, Δt denotes the system delay from microphone to loudspeaker, and G the gain of amplifier. The recursive relationship between y(t) and y(t–Δt) causes re-amplifying of playback signal and leads to a feedback loop that results in an annoying, high-pitched sound, which is known as acoustic howling.

While acoustic howling and acoustic echo are two distinct phenomena, inappropriate handling of acoustic echo can result in howling. The primary differences between these two phenomena are (1) while both of them are fundamentally playback signals, howling is characterized by a gradual buildup of signal energy in a recursive manner and (2) the signal that leads to howling is generated by the same source as the target signal, making the suppression of howling more challenging.

According to an embodiment, suppressing howling may be achieved by incorporating the AHS method within the acoustic loop considering the recursive nature of howling. However, there may be some drawbacks of this embodiment—it may be computationally demanding and may be inefficient for deep learning based methods.

To address these challenges, embodiments of the present disclosure adopts a teacher-forcing training strategy to formulate AHS as a speech separation problem during model training.

Figure 4:
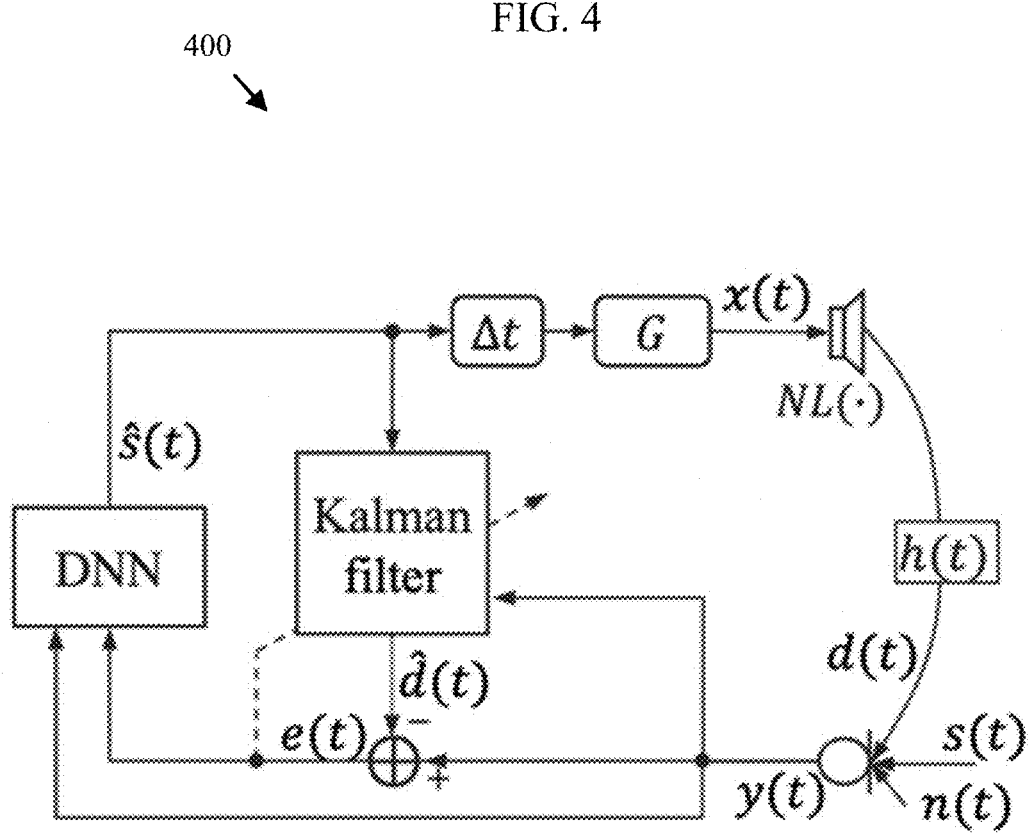
FIG. 4 is a simplified signal diagrams of the hybrid acoustic howling suppression based on a frequency filter model and a deep neural network, according to embodiments.

FIG. 4 is a signal diagram of an acoustic amplification system 400 according to embodiments of the present disclosure for hybrid acoustic howling suppression based on a frequency filter model and a deep neural network.

According to this embodiment, the assumption is that the Hybrid AHS model, once properly trained, can attenuate interferences and transmit only the target speech to the loudspeaker, and consequently, the actual output $\widehat{s(t)}$ in FIG. 4 may be replaced with the ideal target (teacher signal) s(t) during model training, and the recursively defined microphone signal in Eqn (2) is converted into a mixture of target signal, background noise, and an one-time playback signal determined by s(t):

$$y(t) = s(t) + n(t) + NL[s(t - \Delta t) \cdot G] * h(t) \quad \text{Eqn (3)}$$

Thus, the overall task of AHS is then transformed into a speech separation problem during offline training. The object is to extract the target signal s(t) from the ideal microphone signal, defined in Eqn (3) and exclusively employed for model training, using the Kalman filter output e(t) as an additional input, thus jointly suppressing howling and noise.

The Kalman filter model/module may utilize microphone signal y(t) and the enhanced signal ŝ(t) as a reference (denoted as r(t)) to obtain an estimate of the acoustic path ĥ(t) and the corresponding feedback d(t). The estimated feedback may then be subtracted from the microphone signal, and the resulting error signal e(t) may be employed for filter weight updating. The overall process may be viewed as a two-step procedure (prediction and updating) with Kalman filter weights updated through the iterative feedback from the two steps.

In the prediction step, the near-end signal is estimated as:

$$E(k) = Y(k) - R(k)\hat{H}(k) \quad \text{Eqn (4)}$$

where E, Y, and R are the short-time Fourier transform (STFT) of e(t), y(t), and r(t) respectively, and k denotes the frame index. Ĥ(k) denotes the frequency-domain estimated echo path.

Figure 5A:
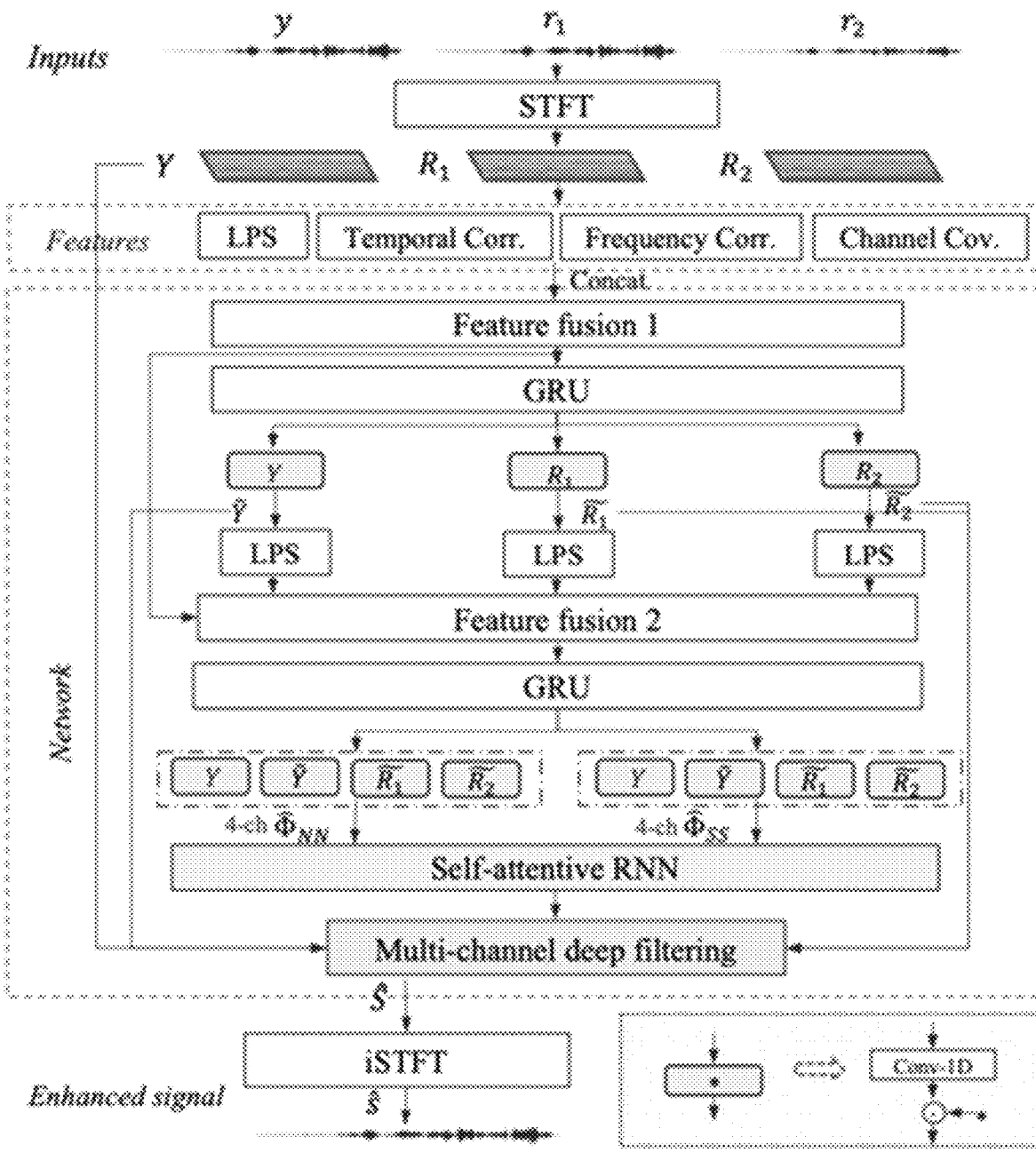
FIG. 5A is an exemplary block diagram of a deep neural-network model for hybrid acoustic howling suppression based on a frequency filter model and a deep neural network, according to embodiments.
Figure 5A:
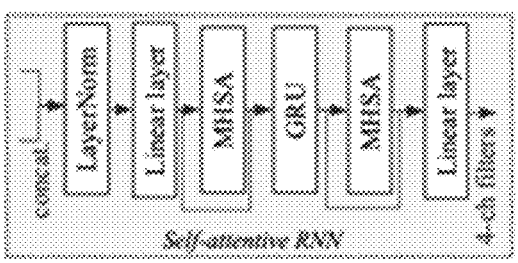
Figure 5A:
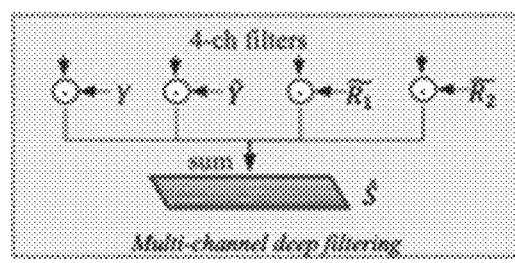
Figure 5B:
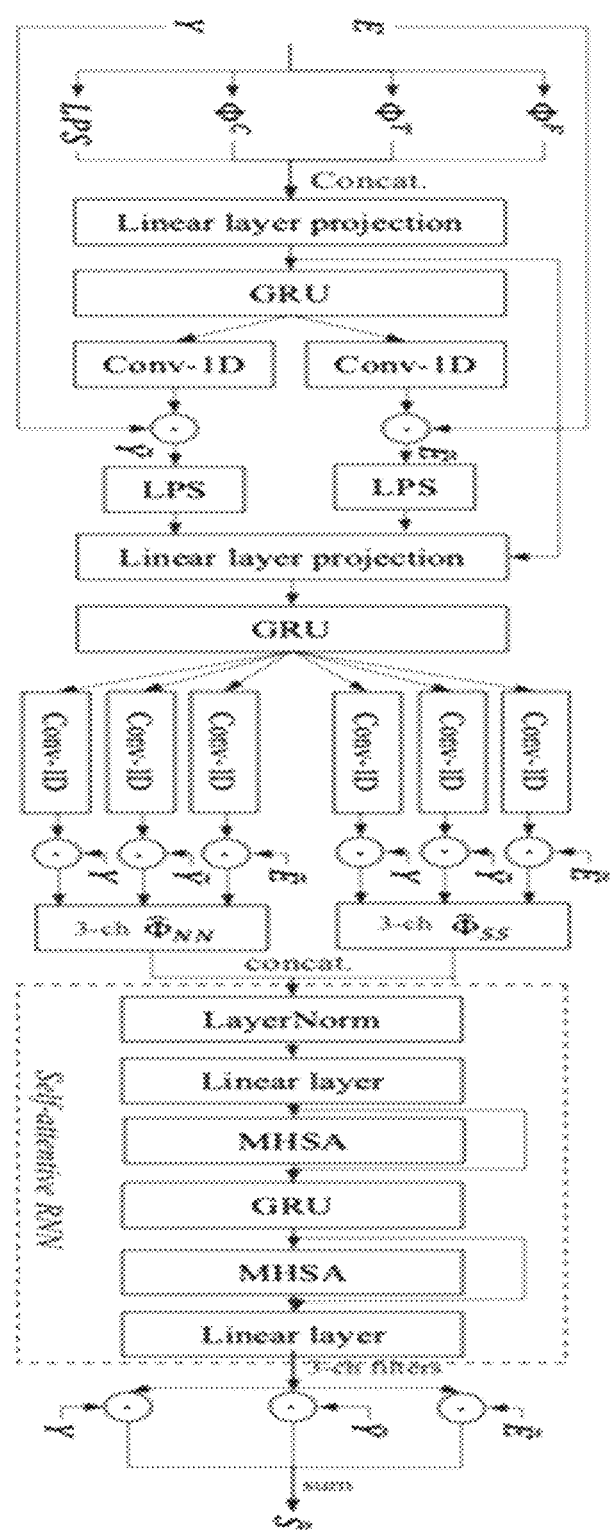
FIG. 5B is an exemplary block diagram of a deep neural-network model for hybrid acoustic howling suppression based on a frequency filter model and a deep neural network, according to embodiments.

The echo path Ĥ(k) is updated in the updating step:

$$\hat{H}(k+1) = A\left[\hat{H}(k) + K(k)E(k)\right] \quad \text{Eqn (5)}$$

where A is the transition factor. K(k) denotes the Kalman gain, which is obtained using covariances calculated from state estimation error, observation and process noises FIGS. 5A-5B are exemplary block diagrams 500 and 550 respectively, of a deep neural-network model for hybrid acoustic howling suppression based on a frequency filter model and a deep neural network, according to embodiments.

The DNN modules, as illustrated in diagrams 500 and 550, may accept a pre-processed signal using the Kalman filter e and an ideal micro-phone signal may be generated via teacher forcing learning y as inputs for model training. The input signals, which may be sampled at 16 kHz, may be split into frames of 32 ms and a frame shift of 16 ms. A 512-point STFT may then be performed on each frame, resulting in the frequency domain inputs, Y and E. Besides the normalized log-power spectra (LPS), the correlation matrix across time frames and frequency bins may be extracted of the input signals to capture the signals' temporal and frequency dependency. These features help in differentiating between howling and tonal components. Channel covariance of input signals (Y and E) may be calculated as another input feature to account for cross-correlation between them. A concatenation of these features may then be used for model training with a linear layer for feature fusion.

The DNN modules may be implemented using a self-attentive recurrent neural network (SARNN). The neural network may be composed of three main parts. The first part may include a gated recurrent unit (GRU) layer with 257 hidden units and two 1D convolution layers. These layers may estimate two complex-valued filters which may be applied on the input signals using deep filtering to obtain intermediate outputs, denoted as Ỹ and Ẽ. The motivation behind obtaining these intermediate outputs is that they may be used as learnt nonlinear reference signals and provide more information for howling suppression. Then, in some embodiments, the LPS of these intermediate signals may be concatenated with the fused feature and then used as inputs for another GRU layer. Y, Ỹ, and Ẽ may be considered as three-channel inputs and employ two 1D convolution layers for each input channel to estimate the playback/noise and target speech components in it. The corresponding covariance matrices of playback/noise $\hat{\Phi}_{NN}$ and target speech $\hat{\Phi}_{SS}$ may be calculated and concatenated as the input to the third part, SARNN. The SARNN part may employ two linear layers, two multi-head self-attention (MHSA), a GRU, and residual connections to estimate a three-channel enhancement filter. The enhanced signal Ŝ is then obtained through multi-channel deep filtering. Finally, an inverse STFT (iSTFT) is used to get waveform ŝ.

A combination of scale-invariance signal-to-distortion ratio (SI-SDR) loss in the time domain and mean absolute error (MAE) loss of spectrum magnitude in the frequency domain for model training:

$$\text{Loss} = -SI-SDR(\hat{s}, s) + \lambda MAE(|\hat{S}|, |S|) \quad \text{Eqn (6)}$$

Where λ is set to 10000 to balance the value range of these two losses.

Embodiments of this disclosure relate to using reference signals learnt for the DNN model because learnt reference signal help improve the performance for the AEC task. Considering the similarities between acoustic echo and acoustic howling, using learnt reference signal(s) is beneficial for suppressing acoustic howling (or/and acoustic echo) as well and computationally efficient.

In FIG. 5, a "Conv-1D" outputs a complex-valued ratio filter, which is then applied upon signal * through deep filtering, denoted as ⊙. The intermediate signals mentioned herein may be obtained by applying a filtering to the corresponding original inputs. Specifically, multiple Conv-1D layers may be applied to learn a complex-valued ratio filter and apply it upon the corresponding input signal through deep filtering. The LPS feature of these intermediate signals, together with the original feature may be used for training the following model. In addition, these intermediate signals may be used later for estimating multi-channel noise and speech covariance matrix, are then used for multi-channel deep filtering for obtaining an estimate of the target signal.

Figure 6:
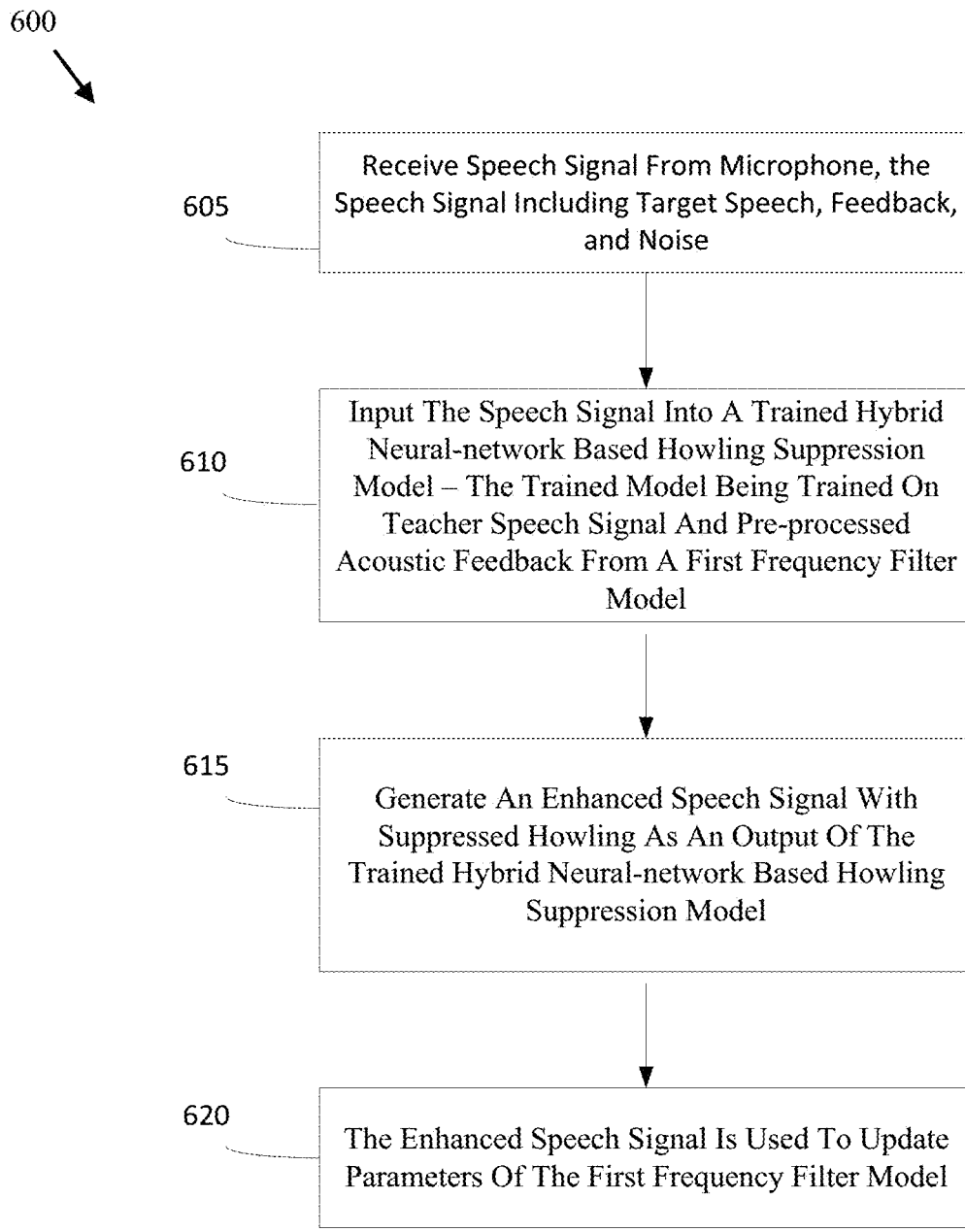
FIG. 6 illustrate flowchart for a process of hybrid acoustic howling suppression based on a frequency filter model and a deep neural network, according to embodiments.

FIG. 6 is a flow diagram 600 illustrating a process for hybrid acoustic howling suppression based on a frequency filter model and a deep neural network, according to embodiments.

At operation 605, a speech signal may be received. The speech signal may comprise target speech, feedback, and noise. In some embodiments, the speech signal may be received from a microphone or a suitable speech input/out device.

At operation 610, the speech signal may be input into a trained hybrid neural-network based howling suppression model. As an example, the speech signal, which may be received from a microphone, may be input into the DNN from FIG. 4 and used to generate enhanced signal ŝ(t).

In some embodiments, the trained hybrid neural-network based howling suppression model may be trained using teacher speech signal and pre-processed acoustic feedback from a first frequency filter model.

In some embodiments, the training process may include generating teacher speech signal, the teacher speech signal comprising a modified microphone signal, wherein the modified microphone signal comprises a target speech signal, a training noise signal, and a one-time playback signal, wherein the one-time playback signal is based on the target speech signal, and wherein the one-time playback signal replaces feedback in an initial microphone signal, and then training the hybrid neural-network based howling suppression model for speech separation using the teacher speech signal and the pre-processed acoustic feedback from the first frequency filter model.

In some embodiments, training the neural-network based howling suppression model for speech separation may be based on a combined loss function, the combined loss function may include a first component based on scale-invariance signal-to-distortion ratio and in some embodiments also include a second component based on a mean absolute error of spectrum magnitude in a frequency domain.

In some embodiments, the training may include generating at least two reference signals, the at least two reference signals including a first intermediate signal based on the teacher speech signal and a second intermediate signal based on the pre-processed acoustic feedback from the first frequency filter model. Then, the neural-network based howling suppression model for speech separation may be trained using the teacher speech signal, the pre-processed acoustic feedback from the first frequency filter model, the first intermediate signal, and the second intermediate signal. In some embodiments, the trained hybrid neural-network based howling suppression model is trained in an offline manner. In some embodiments, the trained hybrid neural-network based howling suppression model is trained in a live manner.

In some embodiments, the pre-processed acoustic feedback from the first frequency filter model is used only for training the neural-network based howling suppression model. In some embodiments, the pre-processed acoustic feedback from the first frequency filter model is not used for generating the enhanced speech signal with suppressed howling as the output of the trained hybrid neural-network based howling suppression model. In some embodiments, the first frequency filter model is based on a Kalman Filter. A person skilled in the art would know that any suitable filter model may be used.

At operation 615, an enhanced speech signal with suppressed howling may be generated as an output of the trained hybrid neural-network based howling suppression model. As an example, the speech signal may be input into the DNN from FIG. 4 and used to generate enhanced signal ŝ(t).

At operation 620, the enhanced speech signal is used to update parameters of the first frequency filter model. As an example, in embodiments where the first frequency filter model is the Kalman filter (e.g., Kalman Filter of FIG. 4), the Kalman Filter can use the enhanced speech for updating its filter weights.

In some embodiments, one or more of the operations 605-620 may be combined or not performed.

The techniques, described above, can be implemented as computer software using computer-readable instructions and physically stored in one or more computer-readable media. For example, FIG. 7 shows a computer system 700 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 7 for computer system 700 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data glove, or joystick 705, but there can also be tactile feedback devices that do not serve as input devices). For example, such devices may be audio output devices (such as: speakers 709, headphones (not depicted)), visual output devices (such as screens 710 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 749 (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 755. Certain protocols and protocol stacks can be used on each of those networks and network interfaces as described above.

Aforementioned human interface devices, human-accessible storage devices, and network interfaces 754 can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like. A graphics adapter 750 may be included in the core 740.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Therefore, in the present disclosure, a Hybrid AHS approach is provided that integrates traditional Kalman filtering with deep learning to suppress acoustic howling. The provided method(s) may include offline training of a SARNN using signals that have been pre-processed by Kalman filtering, as well as a microphone signal generated using teacher forcing training strategy. During streaming inference, the pre-trained model may be inserted into the closed acoustic loop to recursively process the input signals. By leveraging both Kalman filtering and deep learning, the provided method(s) achieve enhanced suppression performance and speech quality for nonlinear AHS in comparison to baseline techniques in both offline and streaming scenarios.

The benefits of Hybrid AHS are twofold (1) using the signal pre-processed by traditional method provides more information for model training and helps reduce the mismatch between offline training and streaming inference, and (2) integrating deep learning to further enhance the output of traditional methods resolves the leakages produced due to nonlinear distortion, resulting in a robust solution.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of hybrid acoustic howling suppression based on a frequency filter model and a deep neural network, the method being executed by at least one processor, the method comprising:
   receiving a speech signal, the speech signal including target speech, feedback, and noise;
   inputting the speech signal into a trained hybrid neural-network based howling suppression model, wherein the trained hybrid neural-network based howling suppression model is trained using training speech signal and pre-processed acoustic feedback from a first frequency filter model; and
   generating an enhanced speech signal with suppressed howling as an output of the trained hybrid neural-network based howling suppression model, wherein the enhanced speech signal is used to update parameters of the first frequency filter model.

2. The method of claim 1, wherein training the hybrid neural-network based howling suppression model comprises:
   generating a teacher speech signal, the teacher speech signal comprising a modified microphone signal, wherein the modified microphone signal comprises a target speech signal, a training noise signal, and a one-time playback signal, wherein the one-time playback signal is based on the target speech signal, and wherein the one-time playback signal replaces feedback in an initial microphone signal; and
   training the hybrid neural-network based howling suppression model for speech separation using the teacher speech signal and the pre-processed acoustic feedback from the first frequency filter model.

3. The method of claim 2, wherein training the hybrid neural-network based howling suppression model for speech separation is based on a combined loss function, the combined loss function comprising a first component based on scale-invariance signal-to-distortion ratio and a second component based on a mean absolute error of spectrum magnitude in a frequency domain.

4. The method of claim 2, wherein training the hybrid neural-network based howling suppression model for speech separation comprises:
   generating at least two reference signals, the at least two reference signals comprising a first intermediate signal based on the teacher speech signal and a second intermediate signal based on the pre-processed acoustic feedback from the first frequency filter model; and
   training the hybrid neural-network based howling suppression model for speech separation using the teacher speech signal, the pre-processed acoustic feedback from the first frequency filter model, the first intermediate signal, and the second intermediate signal.

5. The method of claim 2, wherein the pre-processed acoustic feedback from the first frequency filter model is used only for training the hybrid neural-network based howling suppression model.

6. The method of claim 2, wherein the pre-processed acoustic feedback from the first frequency filter model is not used for generating the enhanced speech signal with suppressed howling as the output of the trained hybrid neural-network based howling suppression model.

7. The method of claim 1, wherein the trained hybrid neural-network based howling suppression model is trained in an offline manner.

8. The method of claim 1, wherein the first frequency filter model is based on a Kalman Filter.

9. An apparatus for hybrid acoustic howling suppression based on a frequency filter model and a deep neural network, the apparatus comprising:
   at least one memory configured to store program code; and
   at least one processor configured to read the program code and operate as instructed by the program code, the program code including:
   first receiving code configured to cause the at least one processor to receive a speech signal, the speech signal comprising target speech, feedback, and noise;
   first inputting code configured to cause the at least one processor to input the speech signal into a trained hybrid neural-network based howling suppression model, wherein the trained hybrid neural-network based howling suppression model is trained using training speech signal and pre-processed acoustic feedback from a first frequency filter model; and
   first generating code configured to cause the at least one processor to generate an enhanced speech signal with suppressed howling as an output of the trained hybrid neural-network based howling suppression model, wherein the enhanced speech signal is used to update parameters of the first frequency filter model.

10. The apparatus of claim 9, wherein training the hybrid neural-network based howling suppression model comprises:
second generating code configured to cause the at least one processor to generate a teacher speech signal, the teacher speech signal comprising a modified microphone signal, wherein the modified microphone signal comprises a target speech signal, a training noise signal, and a one-time playback signal, wherein the one-time playback signal is based on the target speech signal, and wherein the one-time playback signal replaces feedback in an initial microphone signal; and
first training code configured to cause the at least one processor to train the hybrid neural-network based howling suppression model for speech separation using the teacher speech signal and the pre-processed acoustic feedback from the first frequency filter model.

11. The apparatus of claim 10, wherein training the hybrid neural-network based howling suppression model for speech separation is based on a combined loss function, the combined loss function comprising a first component based on scale-invariance signal-to-distortion ratio and a second component based on a mean absolute error of spectrum magnitude in a frequency domain.

12. The apparatus of claim 10, wherein training the hybrid neural-network based howling suppression model for speech separation is based on a combined loss function, the combined loss function comprising a first component based on scale-invariance signal-to-distortion ratio and a second component based on a mean absolute error of spectrum magnitude in a frequency domain.

13. The apparatus of claim 10, wherein training the hybrid neural-network based howling suppression model for speech separation comprises:
third generating code configured to cause the at least one processor to generate at least two reference signals, the at least two reference signals comprising a first intermediate signal based on the teacher speech signal and a second intermediate signal based on the pre-processed acoustic feedback from the first frequency filter model; and
second training code configured to cause the at least one processor to train the hybrid neural-network based howling suppression model for speech separation using the teacher speech signal, the pre-processed acoustic feedback from the first frequency filter model, the first intermediate signal, and the second intermediate signal.

14. The apparatus of claim 10, wherein the pre-processed acoustic feedback from the first frequency filter model is used only for training the hybrid neural-network based howling suppression model.

15. The apparatus of claim 10, wherein the pre-processed acoustic feedback from the first frequency filter model is not used for generating the enhanced speech signal with suppressed howling as the output of the trained hybrid neural-network based howling suppression model.

16. A non-transitory computer-readable medium storing instructions, the instructions comprising: one or more instructions that, when executed by one or more processors of a device for hybrid acoustic howling suppression based on a frequency filter model and a deep neural network, cause the one or more processors to:
receive a speech signal, the speech signal comprising target speech, feedback, and noise;
input the speech signal into a trained hybrid neural-network based howling suppression model, wherein the trained hybrid neural-network based howling suppression model is trained using training speech signal and pre-processed acoustic feedback from a first frequency filter model; and
generate an enhanced speech signal with suppressed howling as an output of the trained hybrid neural-network based howling suppression model, wherein the enhanced speech signal is used to update parameters of the first frequency filter model.

17. The non-transitory computer-readable medium of claim 16, wherein training the hybrid neural-network based howling suppression model comprises:
generating a teacher speech signal, the teacher speech signal comprising a modified microphone signal, wherein the modified microphone signal comprises a target speech signal, a training noise signal, and a one-time playback signal, wherein the one-time playback signal is based on the target speech signal, and wherein the one-time playback signal replaces feedback in an initial microphone signal; and
training the hybrid neural-network based howling suppression model for speech separation using the teacher speech signal and the pre-processed acoustic feedback from the first frequency filter model.

18. The non-transitory computer-readable medium of claim 17, wherein training the hybrid neural-network based howling suppression model for speech separation is based on a combined loss function, the combined loss function comprising a first component based on scale-invariance signal-to-distortion ratio and a second component based on a mean absolute error of spectrum magnitude in a frequency domain.

19. The non-transitory computer-readable medium of claim 17, wherein training the hybrid neural-network based howling suppression model for speech separation comprises:
generating at least two reference signals, the at least two reference signals comprising a first intermediate signal based on the teacher speech signal and a second intermediate signal based on the pre-processed acoustic feedback from the first frequency filter model; and
training the hybrid neural-network based howling suppression model for speech separation using the teacher speech signal, the pre-processed acoustic feedback from the first frequency filter model, the first intermediate signal, and the second intermediate signal.

20. The non-transitory computer-readable medium of claim 17, wherein the pre-processed acoustic feedback from the first frequency filter model is not used for generating the enhanced speech signal with suppressed howling as the output of the trained hybrid neural-network based howling suppression model.

* * * * *